UNITED STATES PATENT OFFICE.

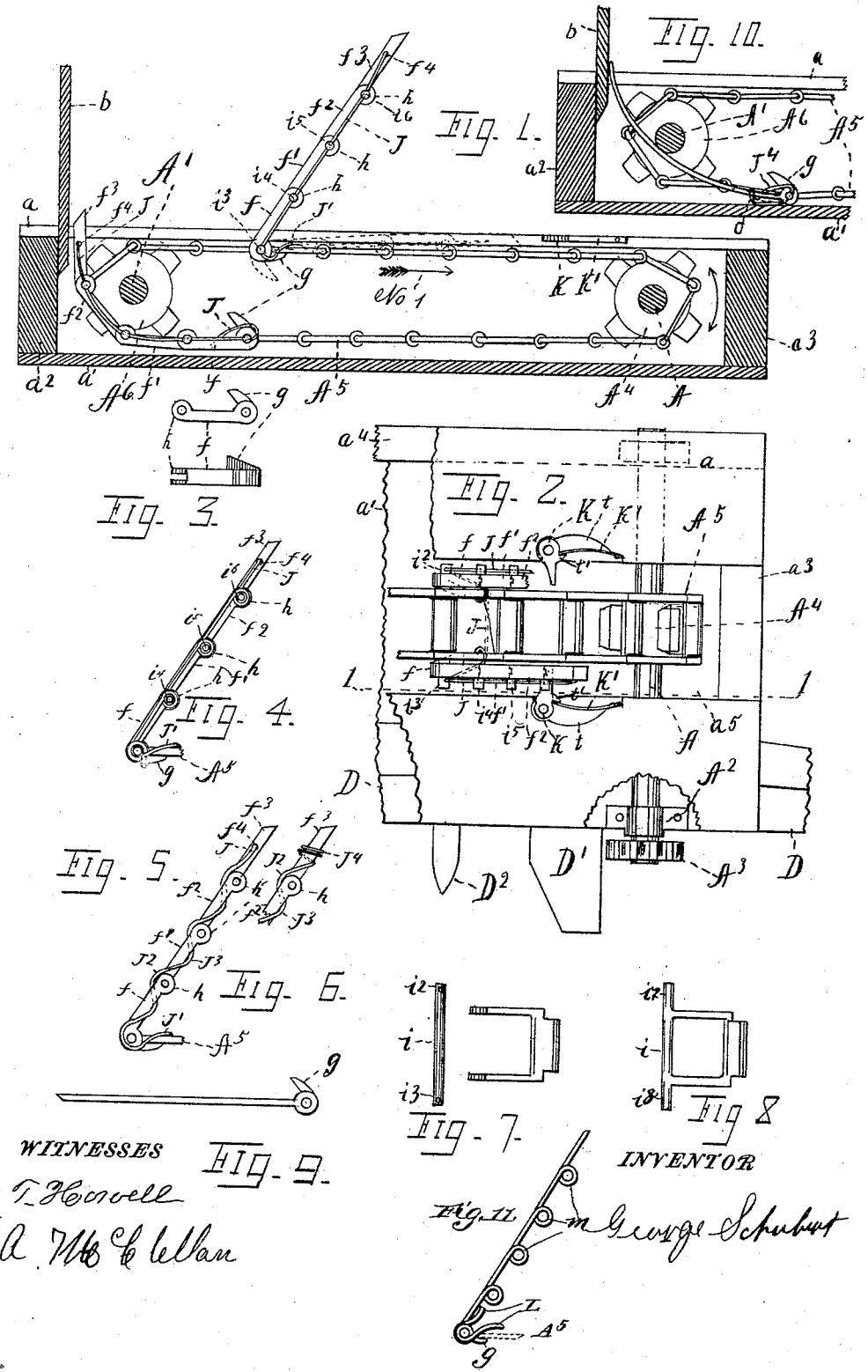
(No Model.)
G. SCHUBERT.
GRAIN CONVEYER FOR HARVESTERS AND BINDERS.
No. 474,416. Patented May 10, 1892.
WITNESSES
INVENTOR
George Schubert

GEORGE SCHUBERT, OF WALNUT, TEXAS.

GRAIN-CONVEYER FOR HARVESTERS AND BINDERS.

SPECIFICATION forming part of Letters Patent No. 474,416, dated May 10, 1892.

Application filed July 8, 1891. Serial No. 398,768. (No model.)

*To all whom it may concern:*

Be it known that I, GEORGE SCHUBERT, a citizen of the United States, residing at Walnut, in the county of Bosque and State of Texas, have invented certain new and useful Improvements in Grain-Conveyers for Harvesters and Binders, of which the following is a specification.

My present invention relates to improvements in grain-conveyers for grain binders and harvesters in which the grain-receiving platform is provided with a reciprocating conveyer or arm or arms to deliver the grain to or off the stubble end of the platform; and the objects of my improvements are to provide a chain with one or more arms, preferably a pair of arms, one on each side of the chains, and said arms are to fold to the chain on their rearward movement, so as to pass to the grain end of the platform beneath the grain and partly around or beneath the shaft at the grain end of the platform, so as to bring the upper or free end of the arms in position to start direct from the grain-board of the grain end of the platform.

I attain the above objects by the mechanism illustrated in the accompanying drawings, in which—

Figure 1 is a sectional view of the platform on line 1 1 of Fig. 2, with the conveyer shown beyond the section-line in full lines. Fig. 2 is a plan view of part of the platform provided with my improved conveyer. Fig. 3 is a plan and a side view of the first joint of the conveyer-arms. Figs. 4, 5, and 6 show modified forms of the spring to operate the conveyer-arms. Fig. 7 is a detail view of the chain-link, to which the conveyer-arms are attached. Fig. 8 is a modified form of same; and Figs. 9, 10, and 11 are modified forms of the conveyer-arms shown in detail and in operation.

Referring to the drawings, $a$ designates the upper floor of the platform and $a'$ its lower floor.

$a^2$ and $a^3$ are cross-sills near each end of the platform, and $a^4$ forms the rear sill of the platform.

$a^5$ designates a slot left in the upper floor of the platform.

D designates the usual finger-bar, provided with the usual guards $D^2$ and shoe $D'$.

A designates a shaft journaled near its front end in a bearing $A^2$ and with its rear end in the sill $a^4$, and provided with a pinion $A^3$ on its forward projecting end, and a sprocket-wheel $A^4$, located on the shaft near the center of the slot $a^5$. The bearing $A^2$ is secured to the finger-bar near the stubble end of the platform.

$A^5$ designates a chain operated by the sprocket-wheel $A^4$ and extending over a sprocket-wheel $A^6$ near the grain end of the platform, secured on a shaft $A'$ near the center of the slot $a^5$. Said shaft $A'$ finds its rear bearing in the sill $a^4$, and its front end is journaled in a bearing similar to $A^2$.

$f$ designates the first section of the conveyer-arms; $f'$, $f^2$, and $f^3$, additional sections connected together by any well-known joints $h\,h\,h$, constructed so as not to unfold to more than a straight line. Any number of such sections can be connected to each other until the desired length of the conveyer-arms are obtained. The sections can be made of any desired length. In practice they should be about two inches in length or even less, so as to operate in a very shallow platform. The first link or section $f$ of each of the conveyer-arms is pivoted to the chain $A^5$, and provided with a downward projection $g$, projecting inward toward the chain $A^5$, to engage with the under side of the chain when the arms are in operation, as shown in Figs. 1, 4, and 5, to prevent their turning over rearward while moving against the grain. The conveyer-arms or joints $f$ are so pivoted to the axle or pin $i$, carried by the chain $A^5$, that they can be folded forward in position, as shown in Fig. 1 in dotted lines, so as to be nearly even or parallel with the chain $A^5$, and the joints are so constructed that each section can be moved to a right or acute angle to each other, so that they can be passed partly around the shaft $A'$ or sprocket-wheel $A^6$, as shown to the left in Fig. 1. Said conveyer-arms are preferably constructed in pairs, as shown in Fig. 2, one on each side of the chain; but one arm may be employed instead of a pair of arms.

J designates a spring looped at $J'$ over the chain $A^5$, with its other end extended through a perforation $i^2$ in the axle or pin $i$, and through the pins $i^4$, $i^5$, and $i^6$, with its upper end secured in a perforation $f^4$, made in the last or upper section $f^3$. Said spring is of sufficient strength to straighten the arm and hold it in an elevated position and at the same time form a key for the above-mentioned pins $i^4$, $i^5$, and $i^6$, by which the joints of the conveyer-arm are connected. The spring J must be weak enough so as not to raise the arms while passing beneath the grain on the platform.

In Figs. 4, 5, and 6 are shown modified forms of the spring J. In Fig. 4 the spring is coiled once or twice around the pins $i^4$, $i^5$, and $i^6$, with its upper end secured in a perforation $f^4$, as shown; or the spring can be wound around the conveyer-arm, as shown in Fig. 5, passing around at $J^3$ underneath, between the joints of the arm and over the center $J^2$ of the joints of the rear or upper side of the arm with its upper end secured in a perforation in the upper joint of the conveyer-arm or coiled once or twice around the upper section $f^3$, as shown at $J^4$. Care must be taken in this instance to form the turns around the joint square enough so as to prevent it unwinding from the conveyer-arm. Instead of the jointed conveyer-arm an elastic arm can be employed, as shown in Figs. 9, 10, and 11.

Fig. 9 shows a straight arm provided with an eye or perforation to be pivoted to an axle or stud on the chain $A^5$, and the projection $g$ to engage with the chain. Said arm can be elevated by a short spring L, as shown in Fig. 11. In Fig. 10 the arm is shown in operation.

Fig. 11 shows the arm provided with a number of coils or turns $m$, so as to receive more elasticity. Said coils $m$ are formed small enough to not catch on the shaft $A'$ when in operation.

The operation may be summarized as follows: The chain $A^5$ is alternately operated in opposite directions by gearing of the harvester (not shown) through the pinion $A^3$ and sprocket-wheel $A^4$. When a proper amount of grain has accumulated on the platform, the conveyer-gearing is started by the operator. As soon as the conveyer-chain $A^5$ is moved forward, as indicated by arrow No. 1 in Fig. 1, the conveyer-arms are moved forward or upward at first until they arrive above the platform, as shown in Fig. 1, when they will move forward against the grain and shift the same to the stubble end of the platform. The dog K yields to the forward movement of the conveyer-arms and is moved back in position by the spring $k'$ as soon as the conveyer-arms are moved past the dogs. At this time the movement of the conveyer is reversed, when the conveyer-arms will come against the dog K and be depressed by said dog into the position, as seen in dotted lines in Fig. 1, and when said arms attain the position as shown to the left in Fig. 1 the movement of the conveyer ceases until again started by the operator.

K is a dog pivoted in the plate $a$ near the stubble end of the platform with its arm extending in the path of the conveyer-arm. Said dog K is operated by a spring K', resting against the projection $t'$ and with its other end secured to the platform. The plate $a$ is cut out at $t$ to provide room for the operation of the dog K and spring K'.

Fig. 7 shows the chain-link detached, carrying the axle or pin $i$ to which the conveyer arm or arms are attached, and Fig. 8 shows a modified form of same, showing an ordinary chain-link provided with studs or ends $i^7$ and $i^8$, to which the conveyer arm or arms can be attached.

A spring J can be employed for each conveyer-arm or one spring J can be employed for both arms when it is taken across the chain $A^5$, as seen in dotted lines in Fig. 2.

Having thus described my invention, what I claim, and desire to secure by Letters Patent, is—

1. In a grain-conveyer for harvesters and binders, a jointed conveyer arm or arms pivoted to a chain or its equivalent and provided with the projection $g$, as shown, and for the purpose described, said arm being elevated and straightened by a spring or its equivalent, substantially as shown and described.

2. In a grain-conveyer for harvesters and binders, a jointed conveyer arm or arms pivoted to a chain or its equivalent and provided with the projection $g$, as shown, and having the axles $i$ or the pins of its joints projecting, as shown, and perforated, a spring extending through said perforations and resting with one end on the chain and secured with its other end to the conveyer-arm, substantially as shown, and for the purpose described.

3. In combination with a harvester-platform having a slotted upper plate and a lower plate, sprocket-wheels arranged within said platform, a reciprocating sprocket-chain passing around said wheels, flexible conveyer-arms pivoted to the sprocket-chain, and springs for holding said arms at an angle with said chains, and a space between the outer sprocket-wheel and the outer end sill of the platform, into which the flexible arm is withdrawn when the chain reciprocates.

GEORGE SCHUBERT.

Witnesses:
W. T. HOWELL,
J. A. MCCLELLAN.